United States Patent [19]
Furuya

[11] Patent Number: 5,159,913
[45] Date of Patent: Nov. 3, 1992

[54] METHOD AND SYSTEM FOR CONTROLLING FUEL SUPPLY FOR INTERNAL COMBUSTION ENGINE COUPLED WITH SUPERCHARGER

[75] Inventor: Junichi Furuya, Isesaki, Japan

[73] Assignee: Japan Electronic Control Systems Co., Ltd., Isesaki, Japan

[21] Appl. No.: 797,940

[22] Filed: Nov. 26, 1991

[30] Foreign Application Priority Data

Nov. 27, 1990 [JP] Japan .................. 2-321045

[51] Int. Cl.⁵ .................. F02D 23/02; F02D 41/12
[52] U.S. Cl. .................................... 123/493
[58] Field of Search ................. 123/493, 486

[56] References Cited

U.S. PATENT DOCUMENTS

| | | | |
|---|---|---|---|
| 4,457,282 | 7/1984 | Muramatsu et al. | 123/486 |
| 4,532,908 | 8/1985 | Steinbrenner | 123/493 |
| 4,690,117 | 9/1987 | Isobe et al. | 123/493 |
| 4,920,941 | 5/1990 | Fukui et al. | 123/493 |

FOREIGN PATENT DOCUMENTS

| | | |
|---|---|---|
| 58-150040 | 9/1983 | Japan . |
| 59-49334 | 3/1984 | Japan . |
| 60-50245 | 3/1985 | Japan .................. 123/493 |
| 62-78443 | 4/1987 | Japan . |
| 1-171323 | 12/1989 | Japan . |
| 1-173359 | 12/1989 | Japan . |

Primary Examiner—Andrew M. Dolinar
Attorney, Agent, or Firm—Foley & Lardner

[57] ABSTRACT

In an internal combustion engine coupled with a supercharger, a basic fuel supply amount is calculated on the basis of an intake air flow rate measured by a hot wire type air flow meter and an engine speed. During an engine decelerating condition, the maximum value (limit value) of the basic fuel supply amount is set on the basis of an open area of an induction system, which is based on a degree of opening of a throttle valve, and the engine speed. The basic fuel supply amount based on the measured value of the air flow meter is limited and can not exceed a value.

12 Claims, 4 Drawing Sheets

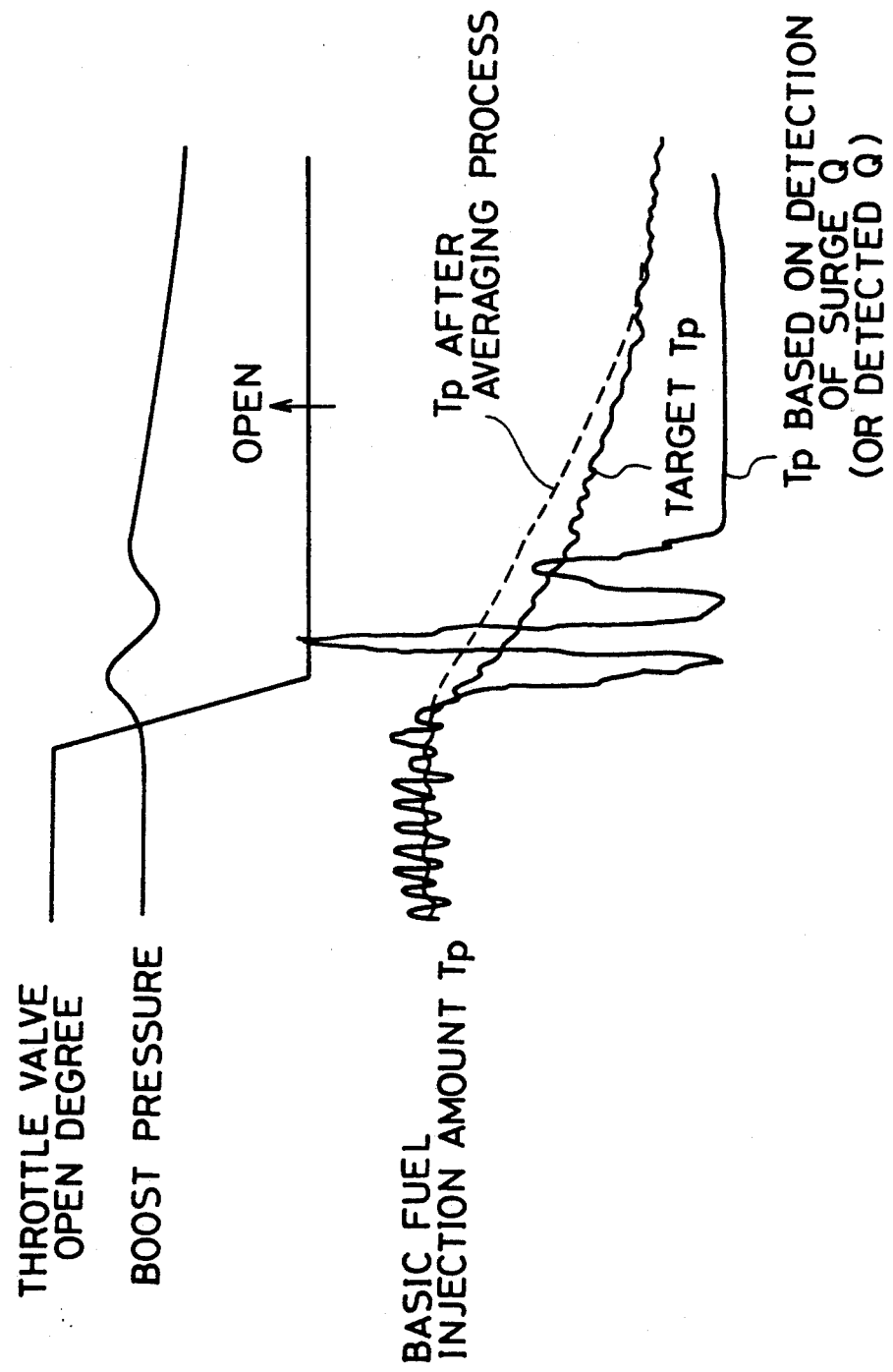

METHOD AND SYSTEM FOR CONTROLLING FUEL SUPPLY FOR INTERNAL COMBUSTION ENGINE COUPLED WITH SUPERCHARGER

BACKGROUND OF THE INVENTION (1) Field of the Invention

The present invention relates to a method and system for controlling fuel supplied to an internal combustion engine coupled with a supercharger. More particularly, the invention relates to a technology for eliminating any imprecision in an amount of fuel supplied due to an error in the detection of an intake air flow rate in an engine coupled with a supercharger.

(2) Related Art of the Invention

In electronic control systems for controlling an amount of fuel supplied to an internal combustion engine, usually a basic fuel supply amount Tp is calculated on the basis of an intake air flow rate Q detected by an air flow meter and an engine revolution speed N, and to control a supply of fuel to the engine based on the basic fuel supply amount Tp. (see Japanese Unexamined Patent Publication (kokai) No. 58-150040 and Japanese Unexamined Patent Publication No. 59-49334)

When the air flow rate Q is measured by an air flow meter and the engine is associated with a supercharger, such as turbocharger, mechanicalcharger and the like for boosting induction air, however, the following problems can arise.

In an internal combustion engine coupled with the supercharger, boosted air is abruptly shut off by a throttle valve during deceleration, to abruptly increase the pressure in a boost chamber between a compressor of the supercharger and the throttle valve, and due to this increased pressure in the boost chamber, the induction air can be directed to upstream of the compressor.

When a hot wire type air flow meter, such as that disclosed in Japanese Unexamined Utility Model Publication (Kokai) 1-171323 is used for measuring the intake air flow rate, the measured air flow rate tends to become much greater than that actually introduced, as such a type of air flow meter measures the air flow as a positive value, regardless of the air flow direction, and this results in a supply of an excess amount of fuel and a consequent overrich air/fuel ratio.

SUMMARY OF THE INVENTION

Therefore, an object of the present invention is to provide a method and a system for controlling an amount of fuel supplied to an internal combustion engine coupled with a supercharger, by which possibility of an excess supply of fuel can be eliminated even when the air flow meter provides an erroneous measurement of an intake air flow rate due to presence of surge flow during deceleration, and thus a poor drivability and emission control performance due to an overrich air/fuel ratio during the decelerating state can be prevented.

Another object of the invention is to provide a method and system for controlling a supply of fuel by which a control for preventing excess supply of fuel can be made with a high precision.

A further object of the present invention is to provide a method and a system for controlling a supply of fuel, by which a control for preventing an erroneous setting of the amount of fuel supplied due to an error by the air flow meter is initiated at a proper timing.

To achieve the above-mentioned objects, in a method and system for controlling supply of fuel to an internal combustion engine coupled with a supercharger, according to the present invention, fuel supplied to the engine is controlled on the basis of a basic fuel supply amount calculated on the basis of an intake air flow rate measured by an air flow meter located upstream of a compressor of the supercharger, and an engine revolution speed. During a deceleration state of the engine, the basic fuel supply amount is limited by a predetermined amount, based on an air flow path area in an induction system which is variably controlled, and the engine revolution speed.

With such a construction, even when an error occurs in the measurement of the intake air flow rate by the air flow meter due to a surge of the air during a deceleration state, and the basic fuel supply amount is excessive relative to the actually introduced intake air flow rate, the basic fuel supply amount is limited to the limit value set without the influence of the surge flow, and thus the error can be corrected.

Here, it is preferable to modify the limit value of the basic fuel supply amount based on the air flow path area of the induction system and the engine revolution speed, based on a boost pressure of the supercharger.

When the intake air is boosted by the supercharger, the intake air flow rate is variable depending upon the boost pressure even at an equal air flow path area and equal engine revolution speed, and a higher precision for limiting the fuel supply amount can be achieved by correcting the limiting amount based on the boost pressure.

It is further preferable to maintain a fuel supply amount control based on the limit value not only during a deceleration state but also for a predetermined period of time after a transition from the deceleration state to the steady state.

Since the error in the measurement of the intake air flow rate at the air flow meter during the engine deceleration state can be maintained even after the engine moves to a steady state, it is preferable to maintain the limitation even after a transition to the steady state, for a given period of time, for a stable transition.

For setting the limit amount based on the air flow path area of the induction system and the engine revolution speed, the cylinder volume efficiency is obtained on the basis of the path area and the engine revolution speed, and the limit amount is based on the volume efficiency.

When the basic fuel supply amount is limited by the limit amount, the amplitude of pulsation of the intake air flow is large, and thus the variation of the basic fuel injection amount becomes large. Therefore, it is desirable to use an average value when adapting the fuel supply amount to a required fuel amount.

The fuel supply control as set forth above is particularly effective when the air flow meter is a hot wire type air flow meter, which tends to measure surge air as normal introduced air.

Other objects and advantages of the present invention will become clear from the detailed description given herebelow in terms of the preferred embodiment, with reference to the accompanying drawings.

BRIEF EXPLANATION OF THE DRAWINGS

FIG. 4 is a timing chart showing a detection of a surge flow during a deceleration state in an air flow meter.

PREFERRED EMBODIMENT

Figure 2:
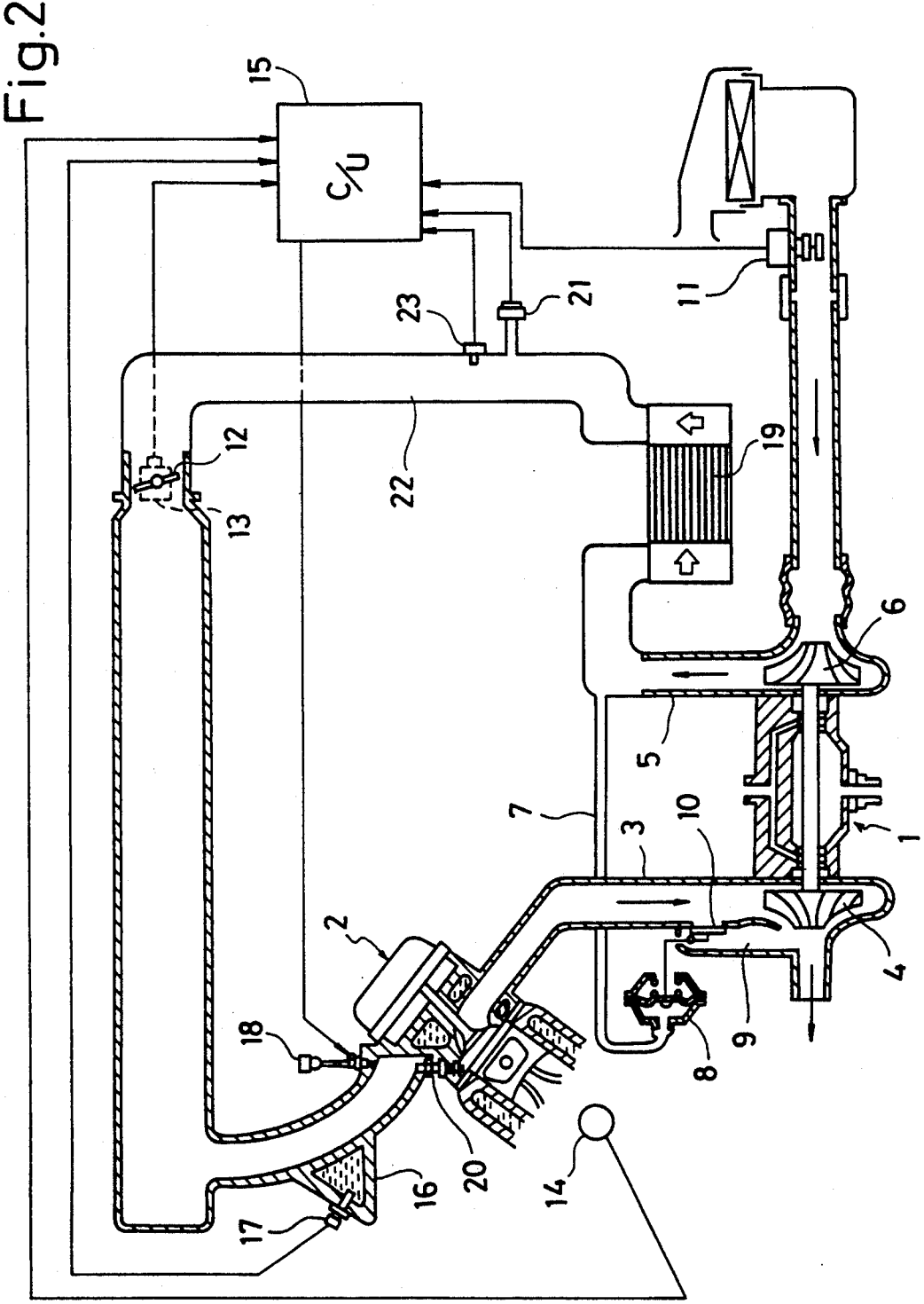
FIG. 2 shows a system construction of one embodiment of the hardware construction of the invention.
Figure 3:
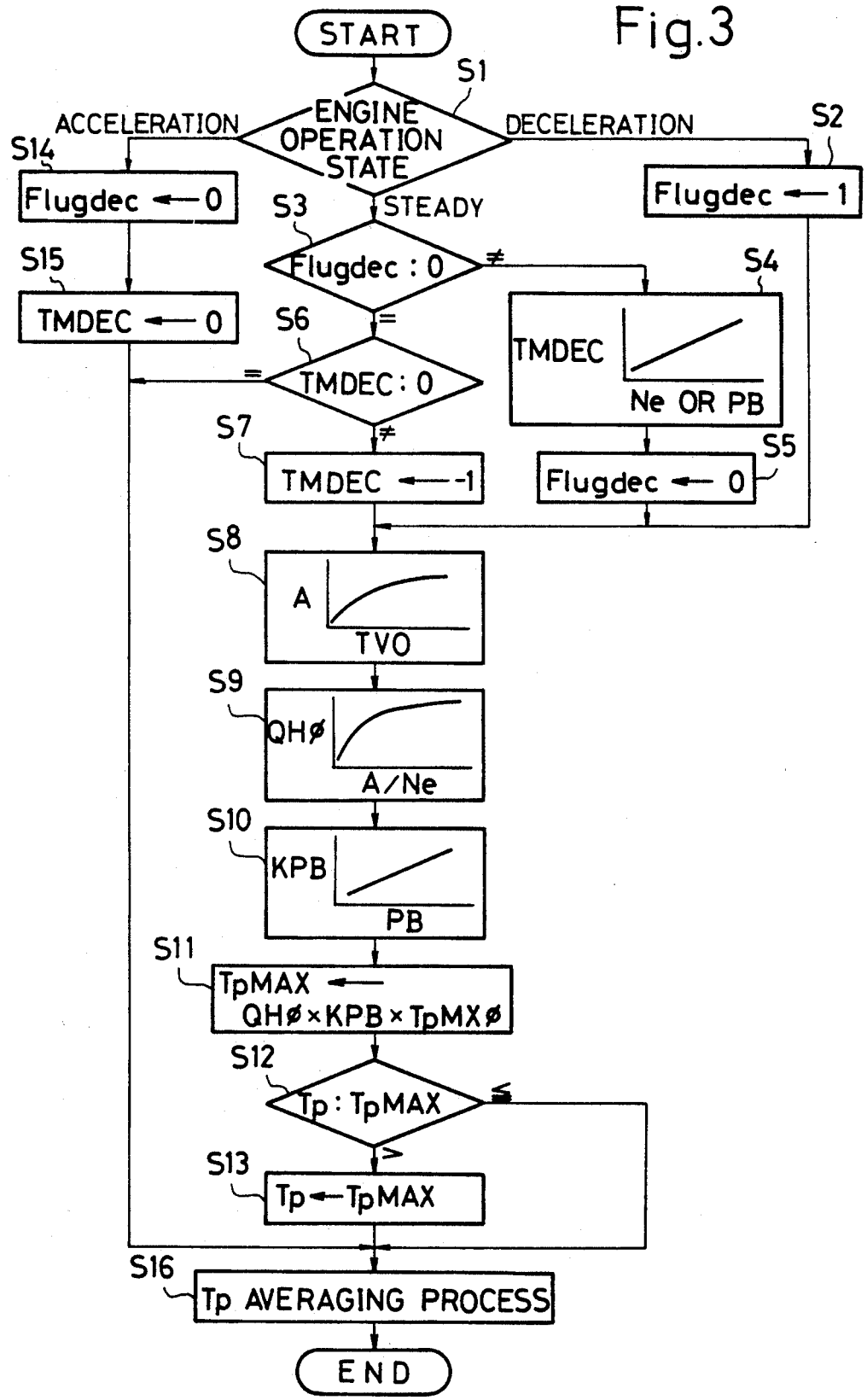
FIG. 3 is a flowchart showing a limitation of the basic fuel supply amount in the preferred embodiment.

The preferred embodiment of a method and a system for controlling a supply of fuel to an internal combustion engine coupled with a supercharger, according to the present invention, is illustrated in FIGS. 2 to 4.

Figure 1:
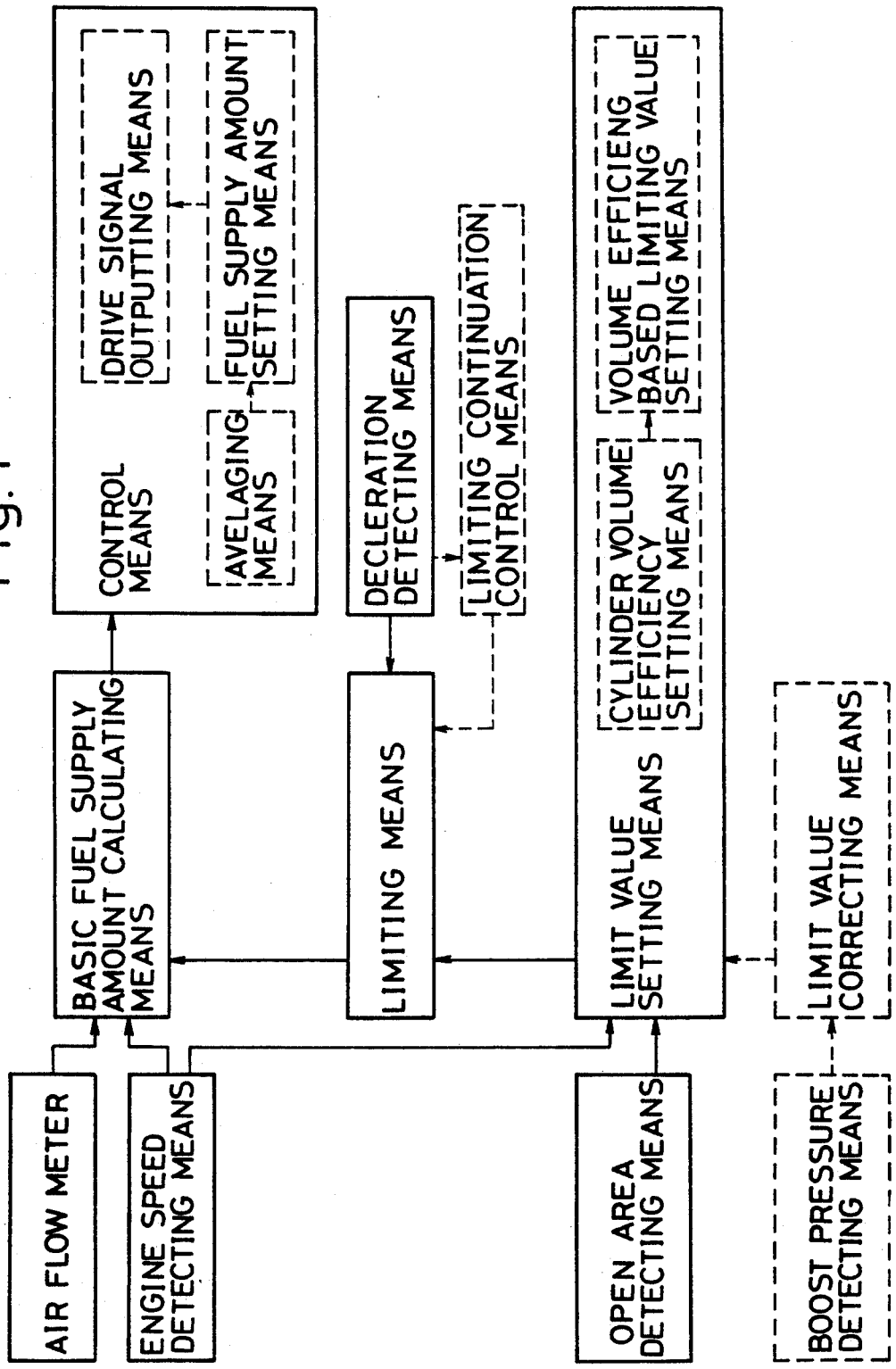
FIG. 1 is a block diagram showing a basic construction of a fuel supply control system for an internal combustion engine coupled with supercharger, according to the present invention.

The basic construction of the fuel supply control system for the internal combustion engine coupled with the supercharger according to the invention is illustrated in FIG. 1, and the following discussion is given with reference also to FIG. 1.

In the preferred system construction illustrated in FIG. 2, an internal combustion engine 2 has a turbocharger 1 as a supercharger for supplying boost air. The turbocharger 1 is designed to drive an exhaust turbine 4 with an energy of an exhaust gas discharged through an exhaust passage 3, and thus drive a compressor 6 disposed within an induction passage 5 and coupled with the exhaust turbine 4 for boosting intake air.

The intake air pressure (boost pressure) downstream of the compressor 6 is introduced into a pressure chamber of a diaphragm type actuator 8 via a pressure passage 7. The diaphragm type actuator 8 is designed to operate a waste gate valve 10, which opens and closes an exhaust gas bypass passage 9 bypassing the exhaust turbine, depending upon the pressure introduced into the pressure chamber.

A control unit 15 receives sensor signals from various sensors including an air flow meter 11, a throttle angle sensor 13, an engine speed sensor 14, a coolant temperature sensor 17 and so on.

The air flow meter 11 comprises a hot wire flow meter and is located upstream of the compressor 6 to produce a sensor signal corresponding to an intake air flow rate Q for the engine 2.

The throttle angle sensor 13 serves as an air flow path area detecting means and is coupled with a throttle valve disposed within the induction passage 5 downstream of the compressor 6 for adjusting the intake air flow path area. The throttle angle sensor 13 produces a throttle open angle signal TVO indicative of a degree of opening of the throttle valve 12.

The engine speed sensor 13 picks up an engine speed signal from a rotation of a crankshaft or a camshaft rotating in synchronism with the crankshaft. The engine speed sensor 13 serves as an engine speed detecting means.

The coolant temperature sensor 17 is disposed within a water jacket 16 in the engine 2 and produces a signal corresponding to a coolant temperature Tw representative of a temperature condition of the engine.

In the shown embodiment, the throttle angle sensor 13 serves not only as the air flow path area detecting means but also as a deceleration state detecting means.

In FIG. 2, the reference numeral 20 denotes a spark ignition plug provided in each of combustion chambers.

In addition, a boost pressure sensor 21 as a boost pressure detecting means is provided in the induction passage 5 downstream of the compressor 6 and upstream of the throttle valve 12. The boost pressure sensor 21 produces a boost pressure detection signal PB for the control unit 15.

The control unit 15 controls the fuel supply principally according to the following process.

First, based on the intake air flow rate Q measured by the hot wire type air flow meter 11 and the engine revolution speed Ne as monitored by the engine speed sensor 14, a basic fuel injection amount (as a basic fuel supply amount) Tp ($\leftarrow K \times Q/Ne$ K: constant) is calculated.

Then, by correcting the basic fuel injection amount Tp based on the coolant temperature Tw as monitored by the coolant temperature sensor 17 and other correction parameters, a final fuel injection amount Ti is derived.

A drive pulse having a pulse width corresponding to the fuel injection amount Ti is output to an electromagnetic fuel injection valve 18 at a timing synchronous with the engine revolution, and the fuel injection valve 18 is intermittently driven to open for a time corresponding to the pulse width, and thus fuel is injected to the engine 2.

As can be appreciated, the control unit 15 serves as a basic fuel supply amount calculation means, a control means a fuel supply amount setting means, and a drive signal output means.

Here, the control unit 15 is designed to limit the basic fuel injection amount Tp derived based on the intake air flow rate Q and the engine revolution speed Ne to a limiting value (maximum basic fuel injection amount Tp) for deriving the final basic fuel injection amount Tp, during a deceleration state of the engine. The process for limiting the basic fuel injection amount Tp according to the present invention is illustrated in a flowchart of FIG. 3.

It should be noted that, as shown in the flowchart of FIG. 3, the functions as a cylinder volume efficiency setting means, a volume efficiency based limiting value setting means, a limit value correcting means, a limiting means, a limitation continuation control means, an averaging processing means, are performed as a software process of the control unit 15.

In the program illustrated in the flowchart of FIG. 3, first, at step 1 (labeled S1 in the drawings, as for all other steps), an engine operating condition is discriminated to determine whether or not the engine 2 is in a transition state, on the basis of variation, of the open angle TVO of the throttle valve 12 as monitored by the throttle angle sensor 13.

This step forms the deceleration detecting means.

If the open angle TVO of the throttle valve 12 is decreasing and if judged that the engine is in a decelerating state, the process is advanced to step 2 to set a deceleration indicative flag Flugdec to "1".

Then, the process goes to step 8 to convert the throttle valve open angle TVO as detected by the throttle angle sensor 13 into the air flow path area A in a throttle chamber. Namely, the air flow path area A corresponds to the intake air flow path area of the air induction system of the engine as controlled by the throttle valve 12 for variation. This step forms the air flow path area detecting means.

Subsequently, at step 9, which corresponds to the cylinder volume efficiency setting means, a cylinder volume efficiency $QH\phi$ is obtained through looking up a map in terms of a resultant value by dividing the open area A by the engine revolution speed Ne.

At a step 10, based on the boost pressure PB detected by the boost pressure sensor 21, a correction value KPB for correcting a maximum basic fuel injection amout TpMAX (limiting value), which will be discussed later, is derived through a map look-up.

At a step 11, based on the cylinder volume efficiency QH$\phi$, a correction value KPB and a basic fuel injection amount TpMX corresponding to 100% of cylinder volume efficiency, the maximum basic fuel injection amount TpMAX (limiting value) is set through the following formula:

$$TpMAX \leftarrow QH\phi \times KPB \times TpMX\phi$$

Namely, the maximum basic fuel injection amount TpMAX corresponding to a predicted intake air flow rate derived from the open area A and the engine revolution speed Ne, is obtained by deriving the cylinder volume efficiency QH$\phi$ from the open area A and the engine revolution speed Ne, multiplying the basic fuel injection amount TpMX$\phi$ corresponding to 100% of the cylinder volume efficiency by the actual cylinder volume efficiency QH$\phi$, and is corrected by multiplying the correction coefficient KPB for an adaption the volume efficiency due to variations of the boost pressure.

The process at step 11 corresponding to the limit value setting means, the volume efficiency based limit value setting means and the limit value correction means.

At step 12, the basic fuel injection amount Tp($\leftarrow$K$\times$Q/Ne K:constant) calculated based on the intake air flow rate Q as measured by the hot wire type air flow meter 11 and the engine revolution speed Ne, is compared with the maximum basic fuel injection amount TpMAX as the limit value derived at the step 11. When the basic fuel injection amount Tp derived on the basis of the air flow rate as measured by the hot wire type air flow meter 11 is greater than the TpMAX, the basic fuel injection amount Tp is set a TpMAX at step 13. Therefore, the basic fuel injection amount Tp is not set at a value greater than the maximum basic fuel injection amount TpMAX.

Namely, for the engine coupled with the exhaust turbocharger 1 as in the shown embodiment, the boosted air is abruptly shut off by the throttle valve during a deceleration state. Then, the boosted air tends to flow back upstream of the compressor. In such a case, the hot wire type air flow meter 11 detects not only the introduced air but also the surge air, to include the component of the surge air amount in the resultant intake air flow rate. As a result, the resultant air flow rate output from the air flow meter becomes much greater than that actually passing through the throttle valve 12.

This causes the basic fuel injection amount Tp to be much greater than that required in connection with the actually introduced air amount, and thus forms an overrich air/fuel mixture.

However, as set forth above, by limiting the basic fuel injection amount Tp by the maximum basic fuel injection amount TpMAX derived from the cylinder volume efficiency calculated based on the open area A regardless of the measured value of the hot wire type air flow meter 11, and the engine revolution speed, the basic fuel injection amount Tp can be set while excluding the surge component. Therefore, the air/fuel mixture will not become overrich even during a deceleration state.

As set forth above, during deceleration state, the basic fuel injection amount Tp based on the hot wire air flow meter 11 is limited by the maximum fuel injection amount TpMAX. According to the shown embodiment, a similar limitation for the basic fuel injection amount Tp is maintained even after a transition from the deceleration state to a steady state engine operation.

Namely, when the throttle valve open angle TVO is held substantially constant, as checked at step 1, and thus it is judged that the engine 2 is in the steady state, the process goes to a step 3 to check whether or not the deceleration state indicative flag Flugdec is set.

When it is judged at step 3 that the deceleration indicative flag Flugdec is set, the engine is in the steady state immediately after a transition from the deceleration state. In such a case, the limitation for TpMAX is maintained after the transition to the steady state, for a predetermined time TMDEC. The time TMDEC may be set on the basis of the engine revolution speed Ne and the boost pressure PB.

Where the engine operating condition is distinguished based on variations of the degree of opening of the throttle valve, to detect a transition state, a steady state and so forth, as in the shown embodiment, even after a transition from the deceleration state to the steady state, a surge flow of the boost air tends to occur as shown in FIG. 4. Accordingly, if a limitation for the basic fuel injection amount Tp to TpMAX is provided only during a deceleration state, based on the open angle TVO of the throttle valve 12, the air/fuel ratio tends to become overrich at the initial stage of the steady state driving.

Therefore, according to the shown embodiment, the time for maintaining of the limitation for the basic fuel injection amount Tp is maintained after a transition from the deceleration state to the steady state set to be variable depending upon the engine revolution speed Ne and the boost pressure PB, so that limitation with TpMAX can be maintained for a predicted time, in which a surge flow can occur. Since the time in which a surge flow can occur is longer after a deceleration from a high load condition, the predetermined time TMDEC is set to be longer than the engine revolution speed N or the boost pressure PB at the first cycle after a detection of the deceleration state.

After setting the predetermined time TMDEC at step 4, the deceleration indicative flag Flugdec is reset to "0" at step 5. Then, the process is advanced to step 8, in which TpMAX is set and a limitation for the basic fuel injection amount Tp with TpMAX is made as during the deceleration state.

On the other hand, when the deceleration indicative flag Flugdec is reset "0", as checked at step 3, the process advances to step 6, in which it is judged whether or not TMDEC is zero(0).

When TMDEC is not zero, the process advances to step 7, in which TMDEC is decremented by one (1). Then, a subsequent process from step 8 is performed while continuing the limitation with TpMAX. On the other hand, when it is judged that TMDEC is zero at step 6, process jumps to step 16 to skip the process for limiting the basic fuel injection amount Tp with TpMAX.

Namely, at the first cycle immediately after the transition from the deceleration state to the steady state, the predetermined time TMDEC is set and counted down by 1 at every execution cycle of the shown program until TMDEC becomes zero. During this period, the limitation for the basic fuel injection amount Tp to TpMAX is maintained. When TMDEC becomes zero, the limitation is cancelled to return to a normal state fuel injection amount control. Through the process set forth above, an overrich air/fuel ratio during a steady state driving immediately after a transition from the deceleration state can be successfully prevented.

The process of steps 3 to 7 corresponds to the limitation continuation control means.

On the other hand, when it is judged that the engine 2 is in an acceleration state at step 1, the process advances to step 14, in which the deceleration indicative flag Flugdec is reset to "0", and subsequently, at step 15, the predetermined time TMDEC is reset to zero. Then the process advances to step 16 without performing a limitation for the basic fuel injection amount Tp.

Accordingly, when the engine operating state is in transit from the deceleration state to the steady state, to cause a setting of TMDEC at the value corresponding to the engine revolution speed and the boost pressure, and subsequently is in transit to the acceleration state, the limitation for the basic fuel injection amount Tp is instantly cancelled, to permit an increase of the basic fuel injection amount for acceleration, and thus TpMAX will not affect the acceleration characteristics of the engine.

At step 16, an averaging process for the fuel injection amount Tp is performed. The averaging process is effective for the basic fuel injection amount Tp limited to TpMAX. Such a process is particularly effective during the engine decelerating state. Since an influence of pulsations of the intake air is substantial. Nevertheless, the average process at step 16 avoids the influence of the pulsatile flow of the intake air when deriving the fuel injection amount.

After the averaging process at step 16, a correction of the basic fuel injection amount Tp is performed with correction parameters, such as the coolant temperature Tw and so on, to derive the final injection amount Ti.

Although the shown embodiment has been discussed in terms of the engine coupled with the exhaust turbocharger 1, the present invention is also applicable to an engine coupled with a mechanical supercharger directly of mechanically driven by the engine.

Furthermore, although the shown embodiment specifically employs the hot wire type air flow meter 11, the limitation of the basic fuel injection amount with TpMAX (limitation value), as discussed in terms of the shown embodiment, is equally effective for any type of air flow meter affected by the surge flow of the boost air which occurs during a deceleration state of the engine.

What is claimed is:

1. A method of controlling a supply of fuel to an internal combustion engine coupled with a supercharger, comprising the steps of:
    calculating a basic fuel supply amount on the basis of an intake air flow rate measured by an air flow meter located within an air induction passage upstream of a compressor of said supercharger, and an engine revolution speed;
    setting a limit value for said basic fuel supply amount on the basis of an air flow path area of an air induction system, which is variable, and the engine revolution speed;
    limiting said basic fuel supply amount to be less than or equal to said limit value when a deceleration state of the engine is detected; and
    controlling a supply of fuel to the engine based on said basic fuel supply amount.

2. A method of controlling a supply of fuel to the internal combustion engine coupled with the supercharger as set forth in claim 1, further comprising a step of correcting the limitation value derived on the basis of said air flow path area and the engine revolution speed, based on the boost pressure of said supercharger.

3. A method of controlling a supply of fuel to the internal combustion engine coupled with the supercharger as set forth in claim 1, wherein said step of limiting the basic fuel injection amount to be less than or equal to the limit value is maintained for a predetermined time after a transition from a deceleration state to a steady state.

4. A method of controlling a supply of fuel to the internal combustion engine coupled with the supercharger as set forth in claim 1, wherein said air flow meter is a hot wire flow meter.

5. A method of controlling a supply of fuel to the internal combustion engine coupled with the supercharger as set forth in claim 1, wherein said step of setting a limit value for said basic fuel supply amount comprises the steps of:
    setting a cylinder volume efficiency on the basis of the air flow path area of the variable induction system, and the engine revolution speed; and
    setting the limit value for the basic fuel supply amount on the basis of said cylinder volume efficiency.

6. A method of controlling a supply of fuel to the internal combustion engine coupled with the supercharger as set forth in claim 1, wherein said step of controlling a fuel supply to the engine comprises the steps of:
    averaging said basic fuel supply amount;
    calculating a final fuel supply amount by correcting the basic fuel supply amount processed through averaging; and
    outputting a drive signal, corresponding to the final fuel supply amount, to a fuel injection valve.

7. A fuel supply control system for an internal combustion engine coupled with a supercharger comprising:
    an air flow meter disposed within an air induction passage upstream of a compressor of said supercharger and measuring an intake air flow rate;
    an engine speed detecting means for detecting an engine revolution speed;
    a basic fuel supply amount calculating means for calculating a basic fuel supply amount on the basis of the measured air flow rate and detected engine revolution speed;
    an open area detecting means for detecting an open area of a variable induction system of the engine;
    a limitation value setting means for setting a limit value for said basic fuel supply amount on the basis of the detected open area of the engine induction system and the detected engine revolution speed;
    a deceleration detecting means for detecting a deceleration state of the engine; and
    a limiting means responsive to said deceleration detecting means detecting a decelerating condition of the engine, for limiting said basic fuel supply amount to be less than or equal to said limit value.

8. A fuel supply control system for the internal combustion engine coupled with the supercharger as set forth in claim 7, further comprising:

a boost pressure detecting means for detecting a boost pressure of said supercharger;

a limit value correcting means for correcting said limit value for said basic fuel supply amount set by said limit value setting means on the basis of the boost pressure detected by said boost pressure detecting means.

9. A fuel supply control system for the internal combustion engine coupled with the supercharger as set forth in claim 7, wherein said limiting means is maintained for limiting the basic fuel supply amount for a predetermined time after a transition from a deceleration state to a steady state of the engine.

10. A fuel supply control system for the internal combustion engine coupled with the supercharger as set forth in claim 7, wherein said air flow meter comprises a hot wire flow meter.

11. A fuel supply control system for the internal combustion engine coupled with the supercharger as set forth in claim 7, wherein said limiting value setting means comprises:

a cylinder volume efficiency setting means for setting a cylinder volume efficiency on the basis of detected values of the open area and the engine revolution speed;

a volume efficiency based limit value setting means for setting the limit value for said basic fuel supply amount on the basis of the set cylinder volume efficiency.

12. A fuel supply control system as set forth in claim 7, wherein said control means comprises:

an averaging means for averaging said basic fuel supply amount for setting the final basic fuel supply amount;

a fuel supply amount setting means for setting the final fuel supply amount by correcting said basic fuel supply amount processed through the averaging process; and a drive signal outputting means for outputting a drive signal, corresponding to said final fuel supply amount, to a fuel injection valve.

* * * * *